United States Patent
Shimazaki

(10) Patent No.: US 6,724,498 B1
(45) Date of Patent: Apr. 20, 2004

(54) METHOD OF CORRECTING HALFTONE DOT IMAGE DATA AND IMAGE PROCESSING APPARATUS WITH HALFTONE DOT IMAGE DATA CORRECTION

(75) Inventor: Osamu Shimazaki, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 08/229,347

(22) Filed: Apr. 18, 1994

(30) Foreign Application Priority Data

Apr. 19, 1993 (JP) .............................................. 5-091144

(51) Int. Cl.⁷ .............................................. G06F 15/00
(52) U.S. Cl. ...................................... 358/1.8; 358/3.06
(58) Field of Search ................................. 345/101, 106, 345/108, 109, 117, 118, 128, 428, 442; 358/447, 448, 456, 458, 3.06, 518, 521, 1.1, 1.6, 1.8, 1.9, 1.18, 1.19

(56) References Cited

U.S. PATENT DOCUMENTS

| | | | | |
|---|---|---|---|---|
| 4,051,536 A | * | 9/1977 | Roetling | 358/298 |
| 4,347,523 A | | 8/1982 | Ohara | 346/108 |
| 4,586,089 A | * | 4/1986 | Nakazato et al. | 358/280 |
| 4,792,979 A | * | 12/1988 | Nomura et al. | 382/54 |
| 4,845,550 A | * | 7/1989 | Urabe et al. | 358/80 |
| 4,899,216 A | * | 2/1990 | Tatsumi et al. | 358/80 |
| 4,987,498 A | * | 1/1991 | Shimazaki | 358/456 |
| 5,019,896 A | * | 5/1991 | Shimazaki | 358/75 |
| 5,170,257 A | * | 12/1992 | Burns | 358/298 |
| 5,249,067 A | * | 9/1993 | Hirosawa | 358/456 |
| 5,260,806 A | * | 11/1993 | Samworth | 358/456 |
| 5,278,672 A | * | 1/1994 | Shimazaki | 358/456 |
| 5,309,246 A | * | 5/1994 | Barry et al. | 358/298 |

FOREIGN PATENT DOCUMENTS

| | | | | |
|---|---|---|---|---|
| EP | 0334518 | 9/1989 | | H04N/1/40 |
| JP | 60-197071 | 10/1985 | | |
| JP | 62-199170 | 9/1987 | | H04N/1/40 |
| JP | 2-270472 | 11/1990 | | H04N/1/40 |
| JP | 3-129971 | 6/1991 | | |

OTHER PUBLICATIONS

"Fundamentals of Electronic Imaging Systems", Schreiber, 1986, Springer–Verlag, Berlin, pp. 160–183.
"Digital Halftoning on the IBM 4250 Printer", Geotzel et al., I.B.M. Journal of Research and Development, (1987) Jan., No. 1.
Roetling et al., "Journal of Applied Photographic Engineering," vol. 5, No. 4, (Fall 1979), pp. 179–182.

* cited by examiner

*Primary Examiner*—Gabriel Garcia
(74) *Attorney, Agent, or Firm*—Sughrue Mion, PLLC

(57) ABSTRACT

A halftone dot area percentage is determined under desired output conditions as to a recording medium, an exposure condition, a printing condition, a screen ruling, a screen angle, and the like. Continuous tone correction data are generated from the halftone dot area percentage, and stored in a continuous tone correction data memory. A halftone dot corrector corrects desired continuous tone image data based on the continuous tone correction data. Then, the corrected continuous tone image data into halftone dot image data by halftone dot image data binary processor. A high-quality halftone dot image free of tone jump is generated from the halftone dot image data.

10 Claims, 4 Drawing Sheets

FIG.5A

HALFTONE DOT AREA PERCENTAGE (%) OF ORIGINAL FILM PLATE

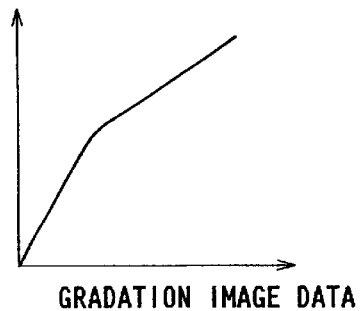

GRADATION IMAGE DATA

FIG.5B

HALFTONE DOT AREA PERCENTAGE (%) OF POSITIVE FILM

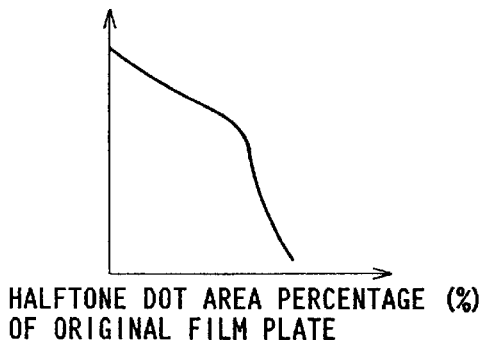

HALFTONE DOT AREA PERCENTAGE (%) OF ORIGINAL FILM PLATE

FIG.5C

HALFTONE DOT AREA PERCENTAGE (%) OF PRESS PLATE

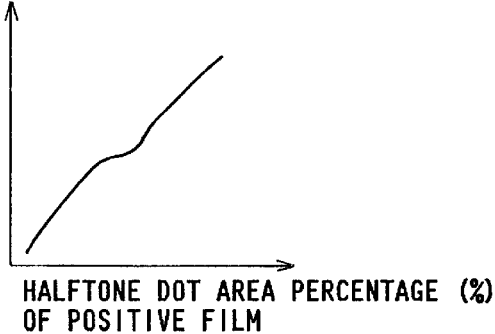

HALFTONE DOT AREA PERCENTAGE (%) OF POSITIVE FILM

FIG.5D

HALFTONE DOT AREA PERCENTAGE (%) OF PRINTED MATERIAL

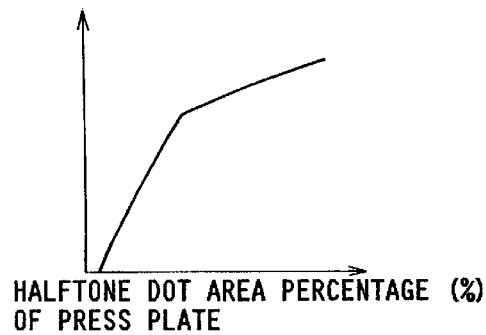

HALFTONE DOT AREA PERCENTAGE (%) OF PRESS PLATE

FIG.5E

HALFTONE DOT AREA PERCENTAGE (%) OF PRINTED MATERIAL

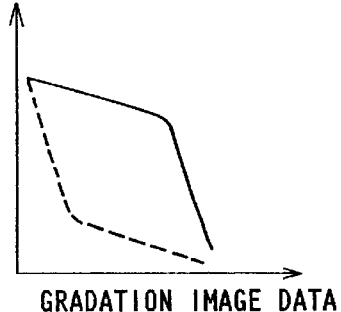

GRADATION IMAGE DATA

METHOD OF CORRECTING HALFTONE DOT IMAGE DATA AND IMAGE PROCESSING APPARATUS WITH HALFTONE DOT IMAGE DATA CORRECTION

BACKGROUND OF THE INVENTION

1. Field of the Invention

The present invention relates to a method of correcting halftone dot image data in order to prevent tone jump from occurring in a halftone dot image which is generated under desired output conditions from the halftone dot image data that are converted from continuous tone image data, and an image processing apparatus capable of correcting such halftone dot image data.

2. Description of the Related Art

In the field of printing and platemaking, there have been employed image reading and recording apparatus for electrically processing image information of a color original and making a film with a view to increasing the efficiency of processing steps and improving the quality of images. In such image reading and recording apparatus, more specifically, the image information recorded on the original is photoelectrically read and converted into image data, which are subjected to various forms of image processing such as sharpness enhancement, tone adjustment, color correction, and the like. Thereafter, a laser beam modulated by the processed image data is scanned over a film to make an original film.

The image on an original film thus produced is recorded on a printed material normally by reversing the negative film into a positive film, producing a press plate from the positive film, and printing the image with the press plate.

A continuous tone image such as a photographic image is usually outputted onto a recording medium such as an original film, a printed material, or the like as follows: Continuous tone image data obtained from a photographic image or the like are first converted into halftone dot image data, and then a halftone dot image is recorded on a recording medium based on the halftone dot image data.

The halftone dot image has its continuous tone expressed by pixels so as to achieve a halftone dot area percentage depending on the continuous tone of the image data. For example, as shown in FIG. 4 of the accompanying drawings, a halftone dot image 2 having a halftone dot area percentage of 50% is produced by blackening pixels 6 in regions 4a, 4b. The regions 4a, 4b are held in contact with each other at a point 8. In the image reading and recording apparatus, however, since a scanning laser beam spot applied to the recording medium has a certain spatial distribution, the laser beam spots that form those pixels 6 which are positioned adjacent to the point 8 overlap each other when the image 2 is formed. Consequently, the halftone dot area percentage of 50% cannot be obtained because the point 8 is widened. Furthermore, there may be instances where no accurate halftone dot area percentage can be achieved in various processes following the process of generating the original film with the image reading and recording apparatus.

FIGS. 5A through 5D of the accompanying drawings show the relationship between continuous tone image data and the halftone dot area percentage on an original film in the process of generating the original film, the relationship between the halftone dot area percentage on the original film and the halftone dot area percentage on a positive film in the process of reversing the negative film into the positive film, the relationship between the halftone dot area percentage on the positive film and the halftone dot area percentage on a press plate in the process of producing the press plate, and the relationship between the halftone dot area percentage on the press plate and the halftone dot area percentage on a printed material in the process of printing a halftone dot image on the printed material, respectively. FIG. 5E of the accompanying drawings illustrates the relationship between the continuous tone image data and the halftone dot area percentage on the printed material based on the accumulation of the relationships shown in FIGS. 5A through 5D.

Therefore, the halftone dot area percentage of output data in each of the above processes and the desired halftone dot area percentage of input data tend to differ from each other depending on output conditions as to whether image data are to be outputted using a laser beam, whether a negative film is to be reversed into a positive film, whether a press plate is to be produced, whether image data are to be printed using ink, and how a screen ruling, a screen angle, and a halftone dot shape are to be set. If the output image data vary greatly from the input image data, then the continuous tone is apt to become discontinuous before and after an area where the output image data differ from the input image data. In the case where a number of processes are involved from the generation of an original film to the printing of a halftone dot image, variations or fluctuations caused in the respective processes are accumulated as shown in FIG. 5E, resulting in an excessive tone jump in the printed halftone dot image.

SUMMARY OF THE INVENTION

It is therefore an object of the present invention to provide a method of correcting halftone dot image data in order to produce a high-quality halftone dot image free of tone jump from the halftone dot image data under desired output conditions which have been converted from continuous tone image data, and an image processing apparatus capable of correcting such halftone dot image data.

The above object can be achieved by an image processing apparatus for converting continuous tone image data into halftone dot image data and generating a halftone dot image from the halftone dot image data, comprising continuous tone correction data memory means for storing continuous tone correction data corresponding to given output conditions, continuous tone image data correcting means for correcting continuous tone image data based on the continuous tone correction data, and converting means for converting the corrected continuous tone image data into halftone dot image data.

The image processing apparatus may also have threshold data memory means for storing threshold data corrected depending on given output conditions, and converting means for converting continuous tone image data into halftone dot image data based on the threshold data.

The given output conditions may include at least one of a type of a recording medium on which the halftone dot image is to be outputted, an exposure condition for the halftone dot image, a printing condition for the halftone dot image, a halftone dot shape for the halftone dot image, a screen ruling for the halftone dot image, and a screen angle for the halftone dot image.

According to the present invention, the above object can also be accomplished by a method of correcting halftone dot image data in converting continuous tone image data into halftone dot image data and generating a halftone dot image from the halftone dot image data under given output conditions, comprising the steps of correcting continuous tone image data based on continuous tone correction data produced for generating a halftone dot image having a given halftone dot area percentage under given output conditions, converting the corrected continuous tone image data into halftone dot image data, and generating a halftone dot image based on the halftone dot image data.

The above object can further be achieved by a method of correcting halftone dot image data in converting continuous tone image data into halftone dot image data and generating a halftone dot image from the halftone dot image data under given output conditions, comprising the steps of converting continuous tone image data into halftone dot image data based on threshold data produced for generating a halftone dot image having a given halftone dot area percentage under given output conditions, and generating a halftone dot image based on the halftone dot image data.

With the above arrangement, continuous tone correction data produced for allowing a halftone dot image produced under desired output conditions to have a desired halftone dot area percentage are stored in the continuous tone correction data memory means. After supplied continuous tone image data have been corrected by the continuous tone image data correcting means based on the continuous tone correction data, the corrected continuous tone image data are converted into halftone dot image data, which are then outputted as a halftone dot image. If the continuous tone correction data are established under various output conditions including the type of a recording medium on which the halftone dot image is to be outputted, the exposure condition for the halftone dot image, the printing condition for the halftone dot image, the halftone dot shape for the halftone dot image, the screen ruling for the halftone dot image, and the screen angle for the halftone dot image, then it is possible to produce a high-quality halftone dot image free of tone jump.

Furthermore, threshold data produced for allowing a halftone dot image produced under desired output conditions to have a desired halftone dot area percentage are stored in the continuous tone correction data memory means, and supplied continuous tone image data are converted into halftone dot image data by the converting means based on the threshold data, after which the halftone dot image data are outputted as a halftone dot image.

Furthermore, a halftone test image is produced from test data under desired output conditions, and the halftone dot area percentage of the produced halftone test image is measured. Then, correction data are determined for correcting the measured halftone dot area percentage into a halftone dot area percentage corresponding to the test data, and halftone dot image data are generated from continuous tone image data based on the correction data. Inasmuch as the correction data are established depending on the desired output conditions, it is possible to produce a high-quality halftone dot image free of tone jump from the halftone dot image data.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 5A through 5D are diagrams showing the relationships between input and output data in the respective processes of the sequence shown in FIG. 2; and FIG. 5E is a diagram showing the relationship between input and output data based on the accumulation of the input and output data shown in FIGS. 5A through 5D.

DETAILED DESCRIPTION OF THE PREFERRED EMBODIMENTS

The principles of the present invention are particularly useful when embodied in the generation of a printed material on which there is recorded a halftone dot image that is generated from a continuous tone image recorded on an original film.

Figure 2:
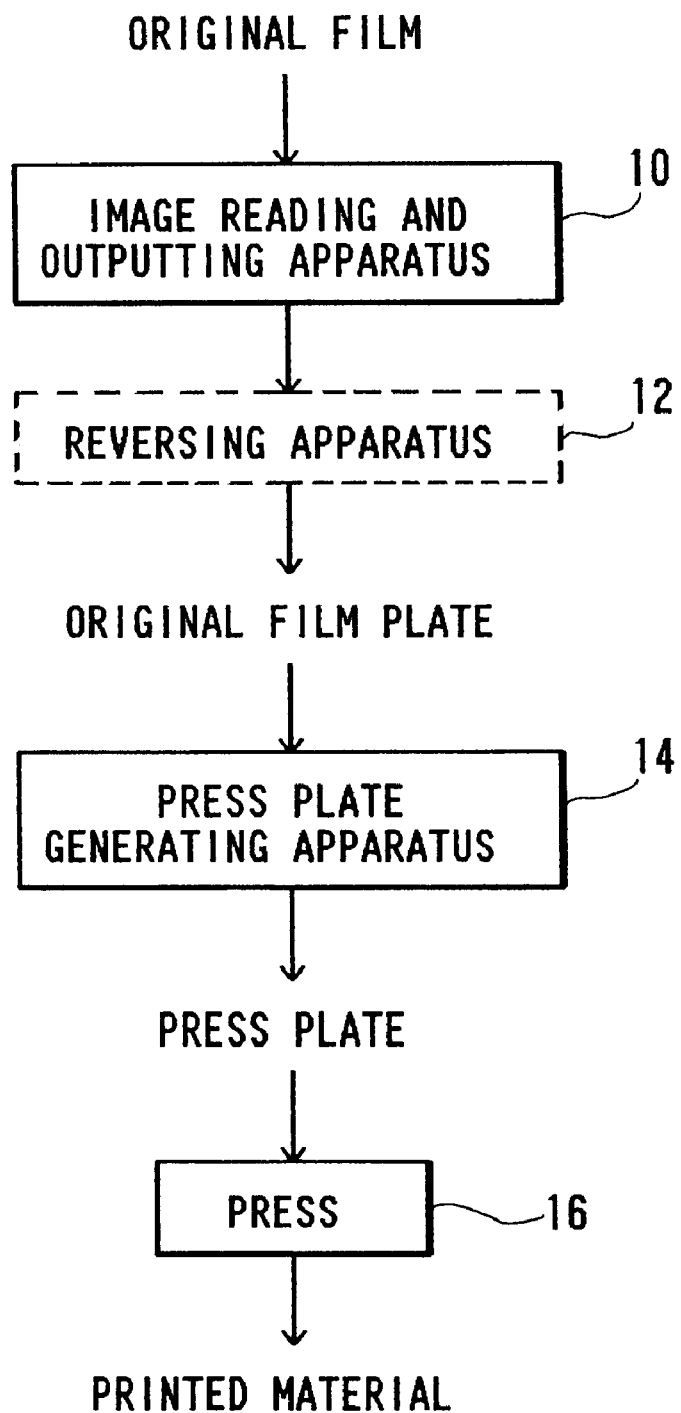
FIG. 2 is a block diagram showing a sequence of producing a printer material with a halftone dot image recorded thereon from an original film with a continuous tone image recorded thereon.

As shown in FIG. 2, a continuous tone image recorded on an original film is read and processed by an image reading and recording apparatus 10, which outputs a halftone dot image on a negative film. If necessary, the negative film is reversed into a positive film as an original film with the halftone dot image thereon by a reversing apparatus 12. The halftone dot image on the positive film is then recorded on a press plate by a press plate generating apparatus 14. Using the generated press plate, a printed material with a halftone dot image recorded thereon is produced by a press 16.

Figure 1:
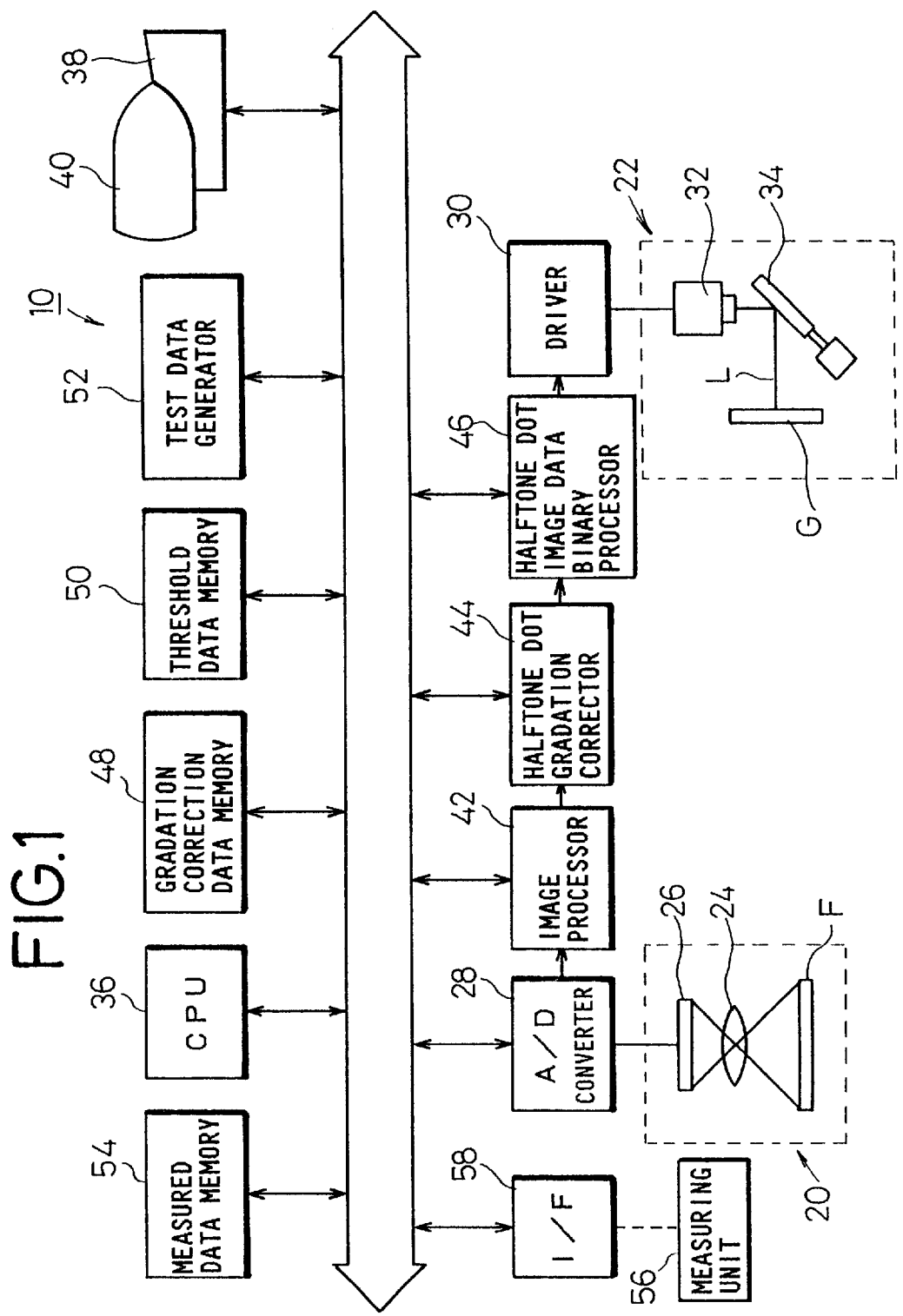
FIG. 1 is a block diagram of an image processing apparatus having a halftone dot image data correcting capability according to the present invention.

FIG. 1 shows the image reading and recording apparatus 10 in detailed block form. The image reading and recording apparatus 10 includes an image reader 20 for reading an original film F on which a continuous tone image is recorded, and an image recorder 22 for recording a halftone dot image on an original film G. In the image reader 20, the image information on the original film F is read in a main scanning direction by a charge-coupled device (CCD) 26 through a condensing optical system 24 while the original film F is being fed in an auxiliary scanning direction. The read image information is supplied from the CCD 26 to an analog-to-digital (A/D) converter 28. In the image recorder 22, a laser diode 32 is energized by a drive signal which is supplied from a driver 30 based on halftone dot image data (described later on), and a laser beam L emitted by the laser diode 32 is applied in a main scanning direction to the original film G through a scanning optical system 34 while the original film G is being fed in an auxiliary scanning direction, thereby recording a halftone dot image on the original film G.

The image reading and recording apparatus 10 has a central processing unit (CPU) 36 which controls the overall operation of the image reading and recording apparatus 10. The image reading and recording apparatus 10 also includes a keyboard 38 for entering data, a cathode-ray tube (CRT) display 40 for displaying data, the A/D converter 28, an image processor 42 for processing continuous tone image data from the A/D converter 28, a halftone dot continuous tone corrector (continuous tone image data correcting means) 44 for correcting the continuous tone image data in order to correct the continuous tone of the outputted halftone dot image, a halftone dot image data binary processor (converting means) 46 for converting the continuous tone image data into binary halftone dot image data, and the driver 30. The image reading and recording apparatus 10 further has a continuous tone correction data memory 48 for storing continuous tone correction data for correcting the continuous tone image data, a threshold data memory 50 for storing threshold data to convert the continuous tone image data into binary data, a test data generator 52 for generating test data to produce the continuous tone correction data, a measured data memory 54 for storing measured data produced by measuring a halftone dot test image generated on the basis of the test data, and an interface 58 for introducing a signal from a measuring unit 56 which measures the halftone dot area percentage of the halftone dot test image. These components of the image reading and recording apparatus 10 are connected to the CPU 36 by a bus. The CPU 36 functions as a continuous tone correction data selecting means or a threshold data selecting means.

Figure 3:
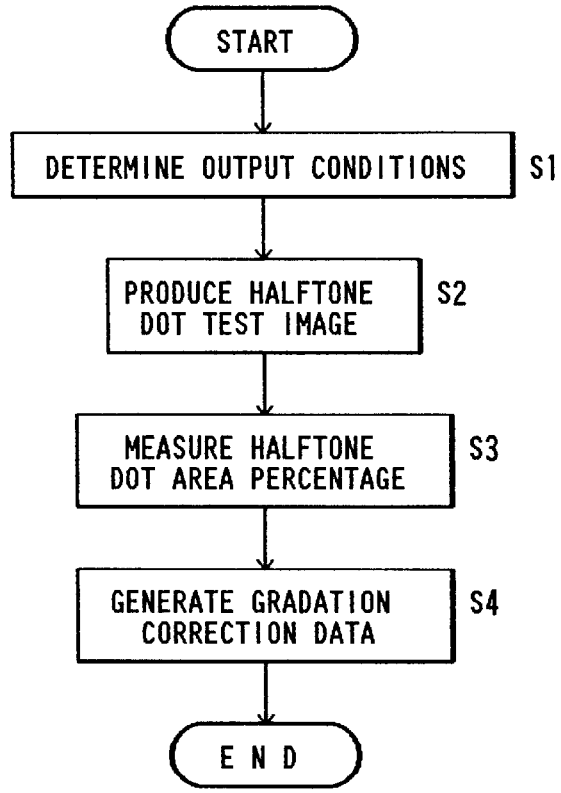
FIG. 3 is a flowchart of a method of correcting halftone dot image data according to the present invention.
Figure 4:
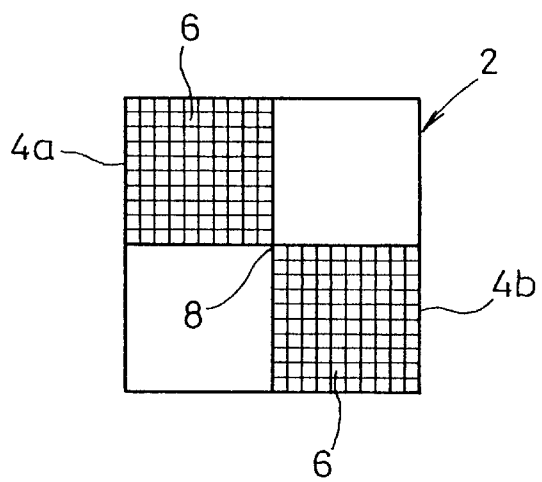
FIG. 4 is a diagram illustrative of a halftone dot image having a halftone dot area percentage of 50%.

A method of correcting halftone dot image data using the image reading and recording apparatus 10 will be described below with reference to FIG. 3.

First, the operator of the image reading and recording apparatus 10 determines, in a step S1, output conditions as to what process, apparatus, and recording medium are to be used to record a halftone dot image, and the screen ruling, screen angle, and halftone dot shape of a final image output. It is assumed here that a halftone dot image is to be recorded on a recording sheet with ink or the like using the reversing apparatus 12, the press plate generating apparatus 14, and the press 16 in the process shown in FIG. 2.

Then, the operator operates the keyboard 38 to instruct the CPU 36 to output test data. The CPU 36 controls the test data generator 52 to output test data to the halftone dot image data binary processor 46.

The test data should preferably be such data that the level of an image signal varies continuously or discretely at given intervals in the overall range of optical densities. For example, if continuous tone image data have 256 tones ranging from 0 to 255, then the test data generator 52 can generate the following test data:

| 0 | 8 | 16 | 24 | 32 | 40 | 48 | 56 |
| 64 | 72 | 80 | 88 | 96 | 104 | 112 | 120 |
| 128 | 136 | 144 | 152 | 160 | 168 | 176 | 184 |
| 192 | 200 | 208 | 216 | 224 | 232 | 240 | 248 |

The halftone dot image data binary processor 46 generates halftone dot test data by comparing the magnitudes of the threshold data from the threshold data memory 50 and the test data from the test data generator 52, and supplies the generated halftone dot test data to the driver 30. Based on the supplied halftone dot test data, the driver 30 energizes the laser diode 32, which emits a laser beam L to record a halftone dot test image on the original film G through the scanning optical system 34. The original film G with the halftone dot test image recorded thereon is then reversed into a positive film by the reversing apparatus 12. From the positive film, the press plate generating apparatus 14 produces a press plate, which is set in the press 16 to print a final halftone dot test image on a recording sheet with ink in a step S2.

The halftone dot area percentage of the halftone dot test image printed in the step S2 is measured by the measuring unit 56, and the measured data are stored in the measured data memory 54 through the interface 58 in a step S3. The measured data may have characteristics as shown in FIG. 5E, for example.

Then, based on the measured data, the CPU 36 determines continuous tone correction data for correcting the halftone dot area percentage produced in the step S3 into a halftone dot area percentage corresponding to the test data, and stores the continuous tone correction data in the continuous tone correction data memory 48 in a step S4. The continuous tone correction data may be such data as indicated by the broken lines in FIG. 5E because they are intended to correct the variation or fluctuation of the measured data as indicated by the solid line in FIG. 5E. Such continuous tone correction data may be produced for each of a plurality of sets of output conditions desired by the operator, and stored in the continuous tone correction data memory 48.

After the continuous tone correction data have been generated, a printed material with a halftone dot image recorded thereon is produced from an original film F with a desired continuous tone image recorded thereon.

The image information on the original film F is read by the image reader 20, and then converted into digital data by the A/D converter 28. Thereafter, the digital image data are transferred to the image processor 42, which processes the supplied image data for sharpness enhancement, continuous tone adjustment, color correction, and the like. Then, the processed image data are transferred to the halftone dot continuous tone corrector 44. The CPU 36 selects continuous tone correction data corresponding to the preset output conditions from the continuous tone correction data memory 48, and supplies the selected continuous tone correction data to the halftone dot continuous tone corrector 44. The halftone dot continuous tone corrector 44 then corrects the continuous tone image data based on the supplied continuous tone correction data, and sends the corrected continuous tone image data to the halftone dot image data binary processor 46. The CPU 36 also selects threshold data corresponding to the given halftone dot shape from the threshold data memory 50, and supplies the selected threshold data to the halftone dot image data binary processor 46. The halftone dot image data binary processor 46 compares the magnitudes of the corrected continuous tone image data and the threshold data, and supplies the result of comparison as halftone dot image data to the driver 30. The driver 30 supplies a drive signal based on the supplied halftone dot image data to the laser diode 32. The laser diode 32 emits a laser beam L that is applied through the scanning optical system 34 to an original film G for thereby recording a halftone dot image thereon.

Thereafter, the halftone dot image recorded on the original film G is recorded as a halftone dot image on a printed material by the reversing apparatus 12, the press plate generating apparatus 14, and the press 16. Since the halftone dot image on the printed material has been corrected by the selected continuous tone correction data, the halftone dot area percentage of the halftone dot image does not vary greatly in a region containing close continuous tone image data levels, and hence the halftone dot image is free of tone jump which would otherwise be caused by large variations in the halftone dot are a percentage. As a result, the printed halftone dot image is of high quality.

The continuous tone image data may be corrected by the halftone dot image data binary processor 46 rather than by the halftone dot continuous tone corrector 44. Specifically, a halftone dot test image generated on the basis of test data is read by the measuring unit 56, and threshold correction data which have the same characteristics as the characteristics indicated by the solid line in FIG. 5E are generated from the measured data which are supplied from the measuring unit 56. Then, the threshold data stored in the threshold data memory 50 are multiplied by the threshold correction data thus generated, producing new threshold data that are then stored in the threshold data memory 50. After continuous tone image data produced from a desired continuous tone image have been processed by the image processor 42, the processed continuous tone image data are not supplied to the halftone dot continuous tone corrector 44, but compared with the threshold data corrected by the halftone dot image data binary processor 46, thereby producing corrected halftone dot image data In this modification, it is also possible to preset a plurality of threshold data corrected depending on desired sets of output conditions and to select any desired one of the preset threshold data.

While continuous tone correction data are generated so as to eliminate tone jump in a halftone dot image recorded on a printed material in the above embodiment, the present invention is also applicable to an arrangement for generating continuous tone correction data in order to eliminate tone jump in an image on an original film or a press plate.

Although certain preferred embodiments of the present invention has been shown and described in detail, it should be understood that various changes and modifications may be made therein without departing from the scope of the appended claims.

What is claimed is:

1. An image processing apparatus for converting continuous tone image data into halftone dot image data and generating a halftone dot image from the halftone dot image data, comprising:

continuous tone correction data memory means for storing continuous tone correction data corresponding to given output conditions;

continuous tone image data correcting means for correcting continuous tone image data based on said continuous tone correction data; and converting means for converting the corrected continuous tone image data into halftone dot image data.

2. An image processing apparatus in accordance with claim 1, further comprising:

continuous tone correction data selecting means for selecting continuous tone correction data corresponding to given output conditions from said continuous tone correction data memory means, said continuous tone image data correcting means comprising means for correcting the continuous tone image data based on the selected continuous tone correction data.

3. An image processing apparatus in accordance with claim 1, further comprising:

measuring means for measuring a halftone dot area percentage of a halftone dot test image produced under given output conditions based on given test data; and means for producing continuous tone correction data based on the measured halftone dot area percentage.

4. An image processing apparatus for converting continuous tone image data into halftone dot image data and generating a halftone dot image from the halftone dot image data, comprising:

threshold data memory means for storing threshold data corrected depending on given output conditions; and converting means for converting continuous tone image data into halftone dot image data based on the threshold data.

5. An image processing apparatus in accordance with claim 4, further comprising:

threshold data selecting means for selecting threshold data corrected depending on output conditions from said threshold data memory means, said converting means comprising means for converting continuous tone image data into halftone dot image data based on the selected threshold data.

6. An image processing apparatus in accordance with claim 4, further comprising:

measuring means for measuring a halftone dot area percentage of a halftone dot test image produced under given output conditions based on given test data; and means for producing threshold data based on the measured halftone dot area percentage.

7. An image processing apparatus in accordance with any one of claims 1 through 4, wherein said given output conditions include at least one of a type of a recording medium on which the halftone dot image is to be outputted, an exposure condition for the halftone dot image, a printing condition for the halftone dot image, a halftone dot shape for the halftone dot image, a screen ruling for the halftone dot image, and a screen angle for the halftone dot image.

8. A method of correcting halftone dot image data in converting continuous tone image data into halftone dot image data and generating a halftone dot image from the halftone dot image data under given output conditions, comprising the steps of:

correcting continuous tone image data based on continuous tone correction data produced for generating a halftone dot image having a given halftone dot area percentage under given output conditions;

converting the corrected continuous tone image data into halftone dot image data; and generating a halftone dot image based on said halftone dot image data.

9. A method of correcting halftone dot image data in converting continuous tone image data into halftone dot image data and generating a halftone dot image from the halftone dot image data under given output conditions, comprising the steps of:

converting continuous tone image data into halftone dot image data based on threshold data produced for generating a halftone dot image having a given halftone dot area percentage under given output conditions; and generating a halftone dot image based on said halftone dot image data.

10. A method of correcting halftone dot image data in converting continuous tone image data into halftone dot image data and generating a halftone dot image from the halftone dot image data under given output conditions, comprising the steps of:

producing a halftone dot test image under given output conditions based on test data;

measuring a halftone dot area percentage of said halftone dot test image;

determining correction data for correcting the measured halftone dot area percentage into a halftone dot area percentage corresponding to said test data; and generating halftone dot image data from continuous tone image data based on said correction data.

* * * * *